United States Patent
Mun et al.

(10) Patent No.: US 9,873,821 B2
(45) Date of Patent: Jan. 23, 2018

(54) ADHESIVE FILM, ADHESIVE COMPOSITION FOR THE SAME, AND DISPLAY APPARATUS INCLUDING THE SAME

(71) Applicant: Cheil Industries Inc., Gumi-si, Gyeongsangbuk-do (KR)

(72) Inventors: Sung Hyun Mun, Uiwang-si (KR); Lee June Kim, Uiwang-si (KR); Ik Hwan Cho, Uiwang-si (KR); Chan Woo Kim, Uiwang-si (KR); In Cheon Han, Uiwang-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 473 days.

(21) Appl. No.: 14/160,494

(22) Filed: Jan. 21, 2014

(65) Prior Publication Data

US 2014/0205827 A1   Jul. 24, 2014

(30) Foreign Application Priority Data

Jan. 21, 2013   (KR) .................. 10-2013-0006675

(51) Int. Cl.
| | | |
|---|---|---|
| *B32B 7/12* | (2006.01) | |
| *C09J 133/08* | (2006.01) | |
| *C09J 7/02* | (2006.01) | |
| *C09J 133/14* | (2006.01) | |

(52) U.S. Cl.
CPC ........... *C09J 133/08* (2013.01); *C09J 7/0217* (2013.01); *C09J 133/14* (2013.01); *C09J 2203/318* (2013.01); *G02F 2202/28* (2013.01); *Y10T 428/2848* (2015.01); *Y10T 428/2887* (2015.01)

(58) Field of Classification Search
CPC ...... C09J 133/08; C09J 133/14; C09J 7/0217; C09J 2203/318; G02F 2202/28; Y10T 428/2848; Y10T 428/2887
See application file for complete search history.

(56) References Cited

U.S. PATENT DOCUMENTS

| | | | |
|---|---|---|---|
| 5,527,616 A | | 6/1996 | Hatano et al. |
| 5,578,657 A | * | 11/1996 | Inoue .................. C09J 4/06 430/28 |
| 5,754,338 A | | 5/1998 | Wilson et al. |

(Continued)

FOREIGN PATENT DOCUMENTS

| | | |
|---|---|---|
| CN | 1118800 A | 3/1996 |
| CN | 1740256 A | 3/2006 |

(Continued)

OTHER PUBLICATIONS

KAYARAD Data Sheet.*

(Continued)

*Primary Examiner* — Maria Veronica Ewald
*Assistant Examiner* — Travis Figg
(74) *Attorney, Agent, or Firm* — Lewis Roca Rothgerber Christie LLP

(57) ABSTRACT

An adhesive film including a compound including a urethane functional group, the adhesive film having a ratio (B/A) of 180° peel strength (B) after leaving the adhesive film at 70° C. for 2 minutes to 180° peel strength (A) at 25° C. of about 5 or more, is disclosed. A display apparatus including the adhesive film is also disclosed.

7 Claims, 4 Drawing Sheets

(56) References Cited

U.S. PATENT DOCUMENTS

| | | | |
|---|---|---|---|
| 2002/0039651 A1* | 4/2002 | Murata | B32B 7/12 428/354 |
| 2006/0128925 A1 | 6/2006 | Arai et al. | |
| 2008/0038551 A1* | 2/2008 | Shintani | B32B 27/32 428/354 |
| 2012/0064339 A1 | 3/2012 | Yamagata et al. | |
| 2012/0114953 A1* | 5/2012 | Ogawa | C08F 2/48 428/423.1 |
| 2012/0115280 A1 | 5/2012 | Yasuda et al. | |
| 2012/0181703 A1 | 7/2012 | Park et al. | |
| 2012/0231266 A1* | 9/2012 | Saitoh | C09J 7/02 428/332 |
| 2012/0309873 A1* | 12/2012 | Ogawa | C09J 133/08 524/106 |
| 2012/0329970 A1* | 12/2012 | Kishioka | B32B 7/12 526/264 |
| 2013/0040123 A1 | 2/2013 | Cho et al. | |
| 2013/0309434 A1 | 11/2013 | Hiramatsu et al. | |
| 2014/0065417 A1* | 3/2014 | Higashi | C09J 133/066 428/355 AC |
| 2014/0186603 A1 | 7/2014 | Kim et al. | |
| 2014/0378614 A1 | 12/2014 | Kim et al. | |

FOREIGN PATENT DOCUMENTS

| | | | | |
|---|---|---|---|---|
| CN | 101899127 A | 12/2010 | | |
| CN | 102816544 A | 12/2012 | | |
| CN | 102816545 A | 12/2012 | | |
| EP | 2540789 A2 | 1/2013 | | |
| JP | 2003-073638 A | 3/2003 | | |
| JP | 2005-53976 A | 3/2005 | | |
| KR | 10-2012-0082773 A | 7/2012 | | |
| WO | WO 2011/105878 A2 | 9/2011 | | |
| WO | WO 2012/105341 A1 | 8/2012 | | |
| WO | WO 2012150682 A1 * | 11/2012 | | C09J 133/066 |

OTHER PUBLICATIONS

KIPO Office action dated Mar. 9, 2015 in priority application No. 10-2013-0006675, 5 pages.

Taiwanese Patent Office action dated Nov. 19, 2014 in corresponding patent application No. 103102089, 6 pages.

Chinese Patent Office action dated Sep. 6, 2015 in application No. CN 201410279652.3, with English translation, 13 pages.

Chinese Patent Office action dated Mar. 17, 2015, in corresponding patent application No. CN 201410028210.1, with English translation, 20 pages.

* cited by examiner

ADHESIVE FILM, ADHESIVE COMPOSITION FOR THE SAME, AND DISPLAY APPARATUS INCLUDING THE SAME

CROSS-REFERENCE TO RELATED APPLICATION

This application claims priority to and the benefit of Korean Patent Application No. 10-2013-0006675, filed on Jan. 21, 2013, in the Korean Intellectual Property Office, the entire content of which is incorporated herein by reference.

BACKGROUND

1. Field

Aspects of embodiments of the present invention relate to an adhesive film, an adhesive composition for the same, and a display apparatus including the same.

2. Description of the Related Art

An optically clear adhesive (OCA) film is an adhesive film used for interlayer adhesion when stacking components in an optical display device, or for attaching a touchscreen for mobile phones. For example, a capacitive touchpad is attached to a window or a film using an adhesive film to sense a change in capacitance of the window or film. In such a touchpad, the adhesive film is stacked between a window glass and a touchscreen panel (TSP) sensor glass. An OCA film enhances clearness (e.g., clarity) of a display screen, exhibits superior adhesion to double-sided tapes, and has a high transmittance similar to glass by allowing 97% or more of light to be transmitted therethrough. The OCA film may be applied not only to mobile phones, but also to tablet PCs, TVs and the like, which have medium or large display screens. When bubbling or lamination failure occurs during lamination of the OCA film, reworking may be appropriate. For example, an adhesive film laminated onto a touch panel can be discarded by separating the adhesive film from the touch panel at high temperature using a wire.

SUMMARY

In accordance with one aspect of the present invention, an adhesive film includes a compound including a urethane functional group, the adhesive film having a ratio (B/A) of 180° peel strength (B) after leaving the adhesive film at 70° C. for 2 minutes to 180° peel strength (A) at 25° C. of about 5 or more.

In accordance with another aspect of the present invention, an adhesive composition includes: (A) a (meth)acrylic copolymer and (B) a urethane (meth)acrylate, the (B) urethane (meth)acrylate having a glass transition temperature of about −5° C. or more and being present in the adhesive composition in an amount of about 1% by weight (wt %) to about 9 wt %, based on the total weight of solids in the adhesive composition.

In accordance with a further aspect of the present invention, a display member includes: an optical film; and the adhesive film attached to one or two surfaces of the optical film.

BRIEF DESCRIPTION OF THE DRAWINGS

These and other features and advantages of embodiments of the present invention will be better understood by reference to the following detailed description when considered in conjunction with accompanying drawings in which.

DETAILED DESCRIPTION

Figure 1:
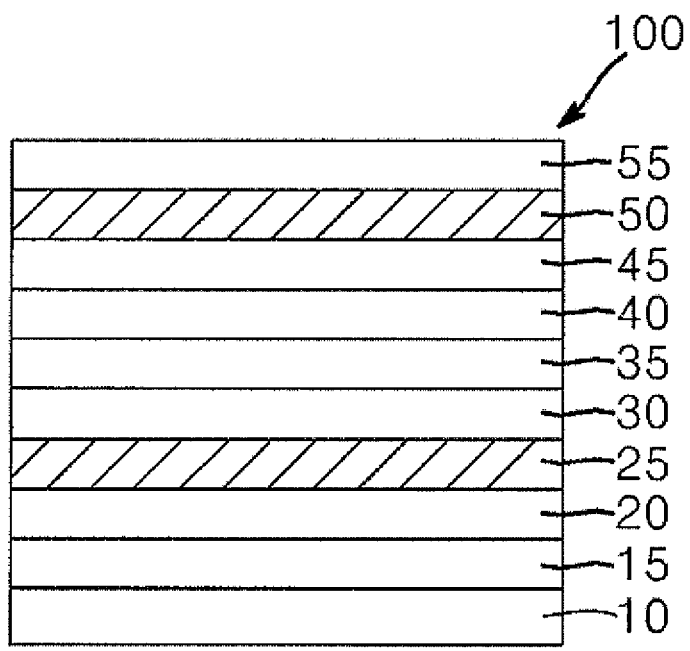
FIG. 1 is a cross-sectional view of a display of an organic light emitting device in accordance with one embodiment of the present invention.

Certain embodiments of the present invention will be described with reference to the accompanying drawings. It should be understood that the present invention is not limited to the following embodiments and may be embodied and modified in many different ways. Descriptions of components not related to the present invention, or those readily understood by those skilled in the art, are omitted for clarity. Like components will be denoted by like reference numerals throughout the specification. As used herein, terms such as "upper side" and "lower side" are defined with reference to the accompanying drawings. Thus, it will be understood that the term "upper side" can be used interchangeably with the term "lower side". In addition, as used herein, the term "(meth)acrylate" may refer to acrylates and/or methacrylates, and the term "copolymer" may refer to oligomers, polymers, or resins. Also, in the context of the present application, when a first element is referred to as being "on" a second element, it can be directly on the second element or be indirectly on the second element with one or more intervening elements therebetween.

An adhesive film according to embodiments of the present invention may be used as an adhesive layer attached to one or both sides of an optical film and may be used to attach glass, substrates, and the like to the optical film. Examples of the optical film may include touch panels, windows, polarizing plates, color filters, retardation films, elliptical polarizing films, reflective films, anti-reflective films, compensation films, brightness enhancing films, alignment films, light diffusion films, glass anti-scattering films, surface protective films, plastic LCD substrates, transparent electrode films of indium tin oxide (ITO), fluorinated tin oxide (FTO), aluminum-doped zinc oxide (AZO), carbon-nanotube (CNT) containing films, Ag-nanowire containing films, graphene, and the like, but the optical film is not limited thereto. For example, the adhesive film is used as an OCA (optically clear adhesive) film attached to a touch panel film.

Next, an adhesive film according to one embodiment will be described.

The adhesive film may have a ratio (B/A) of 180° peel strength (B) after leaving the adhesive film at 70° C. for 2 minutes to 180° peel strength (A) at 25° C. of about 5 or more. If this ratio is less than 5, it is difficult to rework the adhesive film (or the adhesive film cannot be reworked) in the event that a failure occurs upon lamination of the adhesive film onto a base material (for example, a film, glass, substrate, or the like), and residues of the adhesive film can remain on the base material even when the adhesive film is reworked. For example, the adhesive film may have a ratio (B/A) of about 5 to about 25, for example, about 5 to about 10, or, for example, about 5 to about 9.5.

As used herein, the term "peel strength" refers to a force required to peel an adhesive film from a base material (e.g., a film, glass, substrate or the like, such as a glass plate or an ITO film) at 180° at a rate of 0.3 m/min, 30 minutes after the adhesive film (thickness: 175 μm), which is formed on a release film (for example, a polyethylene terephthalate (PET) film, thickness: 50 μm), is attached to the base material. As used herein, the expression "peel strength A" refers to a value measured at 25° C. after the adhesive film is attached to the base material and aged at 25° C. for 30 minutes (e.g., "180° peel strength (A) at 25° C."). As used herein, the expression, "peel strength B" refers to a value measured at 25° C. after the adhesive film is attached to the base material, left at 70° C. for 2 minutes, and aged at 25° C. for 30 minutes (e.g., "180° peel strength (B) after leaving the adhesive film at 70° C. for 2 minutes").

The adhesive film may have a peel strength A of about 300 g/inch or less, for example, about 150 g/inch to about 300 g/inch, but the peel strength A is not limited thereto. Within any of the foregoing ranges, the adhesive film exhibits low initial adhesion and thus allows reworking upon lamination failure of the adhesive film. The adhesive film may have a peel strength B of about 1000 g/inch or more, for example, 1000 g/inch to about 1500 g/inch, but the peel strength B is not limited thereto. Within any of the foregoing ranges, the adhesive film can exhibit high adhesion in a finally adhered state, thereby providing (or securing) reliability.

The adhesive film may have a shear strength at 25° C. of about 15 kgf or more, for example, about 15 kgf to about 40 kgf, but the shear strength is not limited thereto. Within any of the foregoing ranges, the adhesive film has good durability and reliability.

The adhesive film may include a urethane functional group. The adhesive film may include a compound including a urethane functional group (e.g., a urethane (meth)acrylate). The urethane (meth)acrylate reduces initial adhesion of the adhesive film at room temperature, thereby enabling rework of the adhesive film after a failure in a process of laminating the adhesive film to a base material. Thus, when a lamination failure occurs between the adhesive film and the base material (for example, a film, glass, substrate, and the like), the adhesive film can be reworked without leaving a residue of the adhesive film on the base material.

The urethane functional group may be derived from a urethane (meth)acrylate included in an adhesive composition, but the urethane functional group is not limited thereto. The urethane functional group may be at a main chain of the urethane (meth)acrylate.

The adhesive film may be formed from an adhesive composition including the urethane (meth)acrylate. For example, the adhesive film may be prepared by coating the adhesive composition onto a release film (for example, a polyester film including a polyethylene terephthalate film), followed by UV curing. UV curing may be performed at about 30 mW/cm$^2$ to about 200 mW/cm$^2$ for about 1 minute to about 30 minutes, but the UV curing is not limited thereto. UV curing is performed (e.g., advantageously performed) in oxygen-free conditions (e.g., in an atmosphere that is substantially free from oxygen). As used herein, the term "substantially" is used as a term of approximation, and not as a term of degree. In particular, as used herein, "substantially free from oxygen" refers to the absence of most oxygen molecules, but some trace amount of oxygen may be present. In some embodiments, the atmosphere is completely free from oxygen. The adhesive composition may be coated to a thickness of about 50 μm to about 2 mm, for example, about 50 μm to about 1.5 mm, but the thickness is not limited thereto.

The adhesive film may have a thickness (excluding the release film) of about 10 μm to about 2 mm, for example, 100 μm to 1.5 mm, but the thickness is not limited thereto.

According to one embodiment, the adhesive composition may include (A) a (meth)acrylic copolymer and (B) a urethane (meth)acrylate. For example, the adhesive film may include a cured product of the adhesive composition including the urethane (meth)acrylate and the (meth)acrylic copolymer.

The (meth)acrylic copolymer may be a copolymer not including a urethane functional group (e.g., a non-urethane (meth)acrylic copolymer), and may be a copolymer of a monomer mixture (e.g., a copolymer copolymerized from a monomer mixture) including a $C_1$ to $C_{20}$ alkyl group-containing alkyl(meth)acrylate, an alicyclic group-containing (meth)acrylate, a hydroxyl group-containing monomer, or a mixture thereof.

The $C_1$ to $C_{20}$ alkyl group-containing alkyl(meth)acrylate may include a linear or branched, unsubstituted $C_1$ to $C_{20}$ alkyl group-containing (meth)acrylic acid ester. Examples of the $C_1$ to $C_{20}$ alkyl group-containing alkyl(meth)acrylate may include methyl(meth)acrylate, ethyl(meth)acrylate, propyl(meth)acrylate, butyl(meth)acrylate, pentyl(meth)acrylate, hexyl(meth)acrylate, ethylhexyl(meth)acrylate (EHA), heptyl(meth)acrylate, octyl(meth)acrylate, nonyl(meth)acrylate, decyl(meth)acrylate, undecyl(meth)acrylate, and dodecyl(meth)acrylate, but the $C_1$ to $C_{20}$ alkyl group-containing alkyl(meth)acrylate is not limited thereto. The foregoing examples may be used alone or in a combination (e.g., a mixture) of two or more thereof.

The $C_1$ to $C_{20}$ alkyl group-containing alkyl(meth)acrylate may be present in the monomer mixture (or the (meth)acrylic copolymer) in an amount of about 40 wt % to about 90 wt %, based on the total weight of the monomer mixture (or the (meth)acrylic copolymer), but the $C_1$ to $C_{20}$ alkyl group-containing alkyl(meth)acrylate is not limited thereto. Within this range, the adhesive film and/or the adhesive composition does not exhibit bubbling or detachment under heat resistance and humidity resistance conditions, and can provide good durability. For example, the $C_1$ to $C_{20}$ alkyl group-containing alkyl(meth)acrylate is present in the monomer mixture (or the (meth)acrylic copolymer) in an amount of about 50 wt % to about 70 wt %. For example, the $C_1$ to $C_{20}$ alkyl group-containing alkyl(meth)acrylate is present in the monomer mixture (or the (meth)acrylic copolymer) in an amount of about 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, or 70 wt %.

The alicyclic group-containing (meth)acrylate is a $C_3$ to $C_{20}$ alicyclic group-containing (meth)acrylate, but the alicyclic group-containing (meth)acrylate is not limited thereto. Examples of the alicyclic group-containing (meth)acrylate include isobornyl(meth)acrylate (IBOA), cyclohexyl(meth)acrylate, and cyclopentyl(meth)acrylate, but the alicyclic group-containing (meth)acrylate is not limited thereto. The foregoing examples may be used alone or in a combination (e.g., a mixture) thereof.

The alicyclic group-containing (meth)acrylate may be present in the monomer mixture (or the (meth)acrylic copolymer) in an amount of about 1 wt % to about 30 wt %, based on the total weight of the monomer mixture (or the (meth)acrylic copolymer), but the alicyclic group-containing (meth)acrylate is not limited thereto. Within this range, the adhesive film and/or the adhesive composition can exhibit improved heat resistance, durability, and adhesion. For example, the alicyclic group-containing (meth)acrylate is present in an amount of about 15 wt % to about 25 wt %. For example, the alicyclic group-containing (meth)acrylate is present in an amount of about 15 wt %, 16 wt %, 17 wt %, 18 wt %, 19 wt %, 20 wt %, 21 wt %, 22 wt %, 23 wt %, 24 wt %, or 25 wt %.

Examples of the hydroxyl group-containing monomer include a $C_1$ to $C_{20}$ alkyl group or a $C_5$ to $C_{20}$ cycloalkyl group-containing (meth)acrylate having a hydroxyl group, such as 2-hydroxyethyl(meth)acrylate, 2-hydroxypropyl (meth)acrylate, 2-hydroxybutyl(meth)acrylate, 4-hydroxybutyl(meth)acrylate, 6-hydroxyhexyl(meth)acrylate, 1,4-cyclohexanedimethanol mono(meth)acrylate, 3-chloro-2-hydroxypropyl(meth)acrylate, diethylene glycol mono (meth)acrylate, and the like; an unsaturated $C_1$ to $C_{10}$ alcohol, such as allyl alcohol, and the like, but the hydroxyl group-containing monomer is not limited thereto. The foregoing examples may be used alone or in a combination (e.g., a mixture) of two or more thereof.

The hydroxyl group-containing monomer may be present in the monomer mixture (or the (meth)acrylic copolymer) in an amount of about 1 wt % to about 40 wt %, based on the total weight of the monomer mixture (or the (meth)acrylic copolymer), but the hydroxyl group-containing monomer is not limited thereto. Within this range, the adhesive film and/or the adhesive composition has improved adhesion, exhibits good durability, and does not exhibit bubbling under humidity resistant conditions (or exhibits substantially no bubbling under humidity resistant conditions). For example, the hydroxyl group-containing monomer is present in an amount of about 5 wt % to about 35 wt %. For example, the hydroxyl group-containing monomer is present in an amount of about 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %.

The monomer mixture for the (meth)acrylic copolymer may further include a carboxylic acid-containing monomer, a hetero-alicyclic ring-containing monomer or a mixture thereof.

The carboxylic acid-containing monomer may include (meth)acrylic acid, itaconic acid, maleic acid, or fumaric acid, but the carboxylic acid-containing monomer is not limited thereto. The foregoing examples may be used alone or in a combination (e.g., a mixture) of two or more thereof. The carboxylic acid-containing monomer may be optionally present in the monomer mixture (or the (meth)acrylic copolymer) in an amount of about 10 wt % or less, based on the total weight of the monomer mixture (or the (meth)acrylic copolymer), but the carboxylic acid-containing monomer is not limited thereto. Within this range, the adhesive film and/or the adhesive composition can exhibit improved adhesion and durability. For example, the carboxylic acid-containing monomer is present in the monomer mixture (or the (meth)acrylic copolymer) in an amount of about 0.01 wt % to about 7 wt %, or for example, about 0.01 wt % to about 5 wt %.

The hetero-alicyclic ring-containing monomer may include a (meth)acrylic monomer having a $C_4$ to $C_6$ homogeneous alicyclic ring including nitrogen, oxygen and/or sulfur, but the hetero-alicyclic ring-containing monomer is not limited thereto. For example, the hetero-alicyclic group-containing monomer may include (meth)acryloyl morpholine. The hetero-alicyclic ring-containing monomer may be optionally present in the monomer mixture (or the (meth) acrylic copolymer) in an amount of about 10 wt % or less, based on the total weight of the monomer mixture (or the (meth)acrylic copolymer), but the hetero-alicyclic ring-containing monomer is not limited thereto. Within this range, the adhesive film and/or the adhesive composition can exhibit improved durability and adhesion, and can suppress corrosion of a transparent electrode film. For example, the hetero-alicyclic ring-containing monomer is present in the monomer mixture (or the (meth)acrylic copolymer) in an amount of about 1 wt % to about 5 wt %.

In another embodiment, the (meth)acrylic copolymer may be a non hetero-alicyclic group-based copolymer. For example, the (meth)acrylic copolymer may be a copolymer that does not include a hetero-alicyclic ring.

The (meth)acrylic copolymer may be prepared by adding an initiator to the monomer mixture, and then partially polymerizing the monomer mixture. Partial polymerization is performed until the (meth)acrylic copolymer becomes a liquid having a viscosity at 25° C. of about 500 cPs to about 20,000 cPs. Within this viscosity range, the adhesive composition can be easily coated and provide good workability. Polymerization (e.g., partial polymerization) may be performed by UV irradiation.

As the initiator, a photopolymerization initiator may be used, but the initiator is not limited thereto. The photopolymerization initiator is activated by UV or electron beams to promote radical reaction through activation of carbon-carbon double bonds in the adhesive composition.

Examples of the photopolymerization initiator may include α-hydroxy ketone type compounds, benzyl ketal type compounds, and mixtures thereof, but the photopolymerization initiator is not limited thereto. For example, examples of the α-hydroxy ketone compounds may include 1-hydroxycyclohexylphenylketone, 2-hydroxy-2-methyl-1-phenyl-1-propanone, 2-hydroxy-1-[4-(2-hydroxyethoxy) phenyl]-2-methyl-1-propanone, and the like. The foregoing initiators may be used alone or in combination thereof.

The initiator may be present in the monomer mixture in an amount of about 0.001 to 3 parts by weight, for example, about 0.003 to about 1 part by weight based on 100 parts by weight of the monomer mixture for preparation of the (meth)acrylic copolymer, but the initiator is not limited thereto. Within any of the foregoing ranges, the adhesive composition can have good durability and reliability.

The (meth)acrylic copolymer may have a glass transition temperature (Tg) of about −50° C. to about −5° C., for example, −30° C. to −10° C., but the (meth)acrylic copolymer is not limited thereto. Within any of the foregoing ranges, the adhesive film and/or the adhesive composition can exhibit good properties in terms of workability, durability, and adhesion. For example, the (meth)acrylic copolymer may have a glass transition temperature (Tg) of about −30° C., −29° C., −28° C., −27° C., −26° C., −25° C., −24° C., −23° C., −22° C., −21° C., −20° C., −19° C., −18° C., −17° C., −16° C., −15° C., −14° C., −13° C., −12° C., −11° C., or −10° C.

The (meth)acrylic copolymer may have a viscosity at 25° C. of about 1,000 cPs to about 50,000 cPs, for example, about 1,000 cPs to about 15,000 cPs, or for example, about 1,000 cPs to about 5,000 cPs, but the (meth)acrylic copolymer is not limited thereto.

The (meth)acrylic copolymer may have a weight average molecular weight of about 1,000,000 g/mol to about 4,000,000 g/mol, for example, about 1,500,000 g/mol to about 3,500,000 g/mol, but the (meth)acrylic copolymer is not limited thereto. Within any of the foregoing ranges, the adhesive film and/or the adhesive composition can exhibit good durability and adhesion even after the adhesive composition is cured and left under high temperature and high humidity conditions for a long period of time.

The (meth)acrylic copolymer may be present in the adhesive composition in an amount of about 85 wt % to about 98 wt %, for example 90 wt % to about 97 wt %, about 91 wt % to about 97 wt %, or 94 wt % to about 97 wt %, based on the total weight of solids in the adhesive composition, but the (meth)acrylic copolymer is not limited thereto. Within any of the foregoing ranges, the adhesive composition can provide good adhesion, film transparency, durability, and the like. For example, the (meth)acrylic copolymer is present in the adhesive composition in an amount of about 94 wt %, 94.5 wt %, 95 wt %, 95.5 wt %, 96 wt %, 96.5 wt %, or 97 wt %, based on the total weight of solids in the adhesive composition.

The urethane (meth)acrylate may include a monofunctional (meth)acrylate having a urethane group, but the urethane (meth)acrylate is not limited thereto. As used herein, the term "monofunctional" means that the urethane (meth) acrylate has a single (or sole) (meth)acrylate group.

The urethane (meth)acrylate may have a glass transition temperature of about −5° C. or more, but the urethane (meth)acrylate is not limited thereto. Within this range, the urethane (meth)acrylate can impart reworkability by reducing adhesion of the adhesive film at room temperature. For example, the urethane (meth)acrylate has a glass transition temperature of about −5° C. to about 5° C. For example, the urethane (meth)acrylate has a glass transition temperature of about −5° C., −4.5° C., −4° C., −3.5° C., −3° C., −2.5° C., −2° C., −1.5° C., −1° C., −0.5° C., 0° C., 0.5° C., 1.0° C., 1.5° C., 2.0° C., 2.5° C., 3° C., 3.5° C., 4° C., 4.5° C., or 5° C.

The urethane (meth)acrylate may be present in the monomer mixture (or the (meth)acrylic copolymer) in an amount of about 1 to about 9 parts by weight, for example, about 2 to about 9 parts by weight, or for example, about 3 to about 5 parts by weight, based on 100 parts by weight of the monomer mixture (or the (meth)acrylic copolymer). Within any of the foregoing ranges, the adhesive film and/or the adhesive composition can exhibit improved adhesion at high temperature while suppressing improvement of adhesion at room temperature. For example, the urethane (meth)acrylate is present in an amount of about 3, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 parts by weight.

The urethane (meth)acrylate may be present in the adhesive composition in an amount of less than about 11 wt %, for example, less than about 9 wt %, about 1 wt % to about 9 wt %, about 2 wt % to about 9 wt %, or 2.5 wt % to 5 wt %, based on the total weight of solids in the adhesive composition, but the urethane (meth)acrylate is not limited thereto. Within any of the foregoing ranges, the adhesive composition can provide good durability and improved restorability of the adhesive film. For example, the urethane (meth)acrylate is present in an amount of about 2.5 wt %, 2.6 wt %, 2.7 wt %, 2.8 wt %, 2.9 wt %, 3.0 wt %, 3.1 wt %, 3.2 Wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, or 4.8 wt %.

The adhesive composition may further include the initiator, a crosslinking agent, or a mixture thereof.

As the initiator, a photopolymerization initiator may be used, but the initiator is not limited thereto. The initiator may be as described above.

The initiator may be present in the monomer mixture in an amount of about 0.001 parts by weight to about 5 parts by weight, for example, about 0.003 parts by weight to about 1 part by weight, based on 100 parts by weight of the monomer mixture (or the (meth)acrylic copolymer), but the initiator is not limited thereto. Within any of the foregoing ranges, a curing reaction can be completely achieved (e.g., the curing reaction can be carried out to completion) and it is possible to prevent (or reduce) deterioration in transmittance (e.g., light transmittance) as a result of remaining initiator (e.g., excess initiator) in the adhesive film.

The initiator may be present in the adhesive composition in an amount of about 0.001 wt % to about 5 wt %, for example, about 0.001 wt % to about 1 wt %, based on the total weight of solids in the adhesive composition, but the initiator is not limited thereto. Within any of the foregoing ranges, the adhesive composition does not cause deterioration (or excess deterioration) in transmittance (e.g., light transmittance) of the adhesive film due to remaining initiator (e.g., excess initiator remaining in the adhesive film).

As the crosslinking agent, a polyfunctional (meth)acrylate curable by active energy rays may be used, but the crosslinking agent is not limited thereto.

Examples of the polyfunctional (meth)acrylate may include bi-functional acrylates, such as 1,4-butanediol di(meth)acrylate, 1,6-hexanediol di(meth)acrylate, neopentylglycol di(meth)acrylate, polyethylene glycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, bis(meth)acryloxyethyl hydroxy isocyanurate, allylated cyclohexyl di(meth)acrylate, tricyclodecane dimethanol di(meth)acrylate, dimethylol dicyclopentane di(meth)acrylate, ethylene oxide-modified hexahydrophthalic acid di(meth)acrylate, neopentylglycol-modified trimethylpropane di(meth)acrylate, adamantane di(meth)acrylate, 9,9-bis[4-(2-acryloyloxyethoxy)phenyl] fluorine, and the like; tri-functional acrylates, such as trimethylolpropane tri(meth)acrylate, dipentaerythritol tri(meth)acrylate, propionate-modified dipentaerythritol tri(meth)acrylate, pentaerythritol tri(meth)acrylate, propylene oxide-modified trimethylolpropane tri(meth)acrylate, tri-functional urethane (meth)acrylate, tris(meth)acryloxyethyl isocyanurate, and the like; tetra-functional acrylates, such as diglycerol tetra(meth)acrylate, pentaerythritol tetra(meth)acrylate, and the like; penta-functional acrylates, such as dipentaerythritol penta(meth)acrylate, and the like; and hexa-functional acrylates, such as dipentaerythritol hexa (meth)acrylate, caprolactone-modified dipentaerythritol hexa(meth)acrylate, urethane (meth)acrylate (for example, reaction products of an isocyanate monomer and trimethylolpropane tri(meth)acrylate), and the like, but the polyfunctional (meth)acrylate is not limited thereto. The foregoing examples may be used alone or in a combination (e.g., a mixture) thereof.

In one embodiment, the crosslinking agent is a polyfunctional (meth)acrylate of a polyvalent alcohol having 2 to 20 hydroxyl groups.

In addition, the crosslinking agent may include isocyanate, epoxy, aziridine, melamine, amine, imide, carbodiimide, amide crosslinking agents, or mixtures thereof.

The crosslinking agent may be present in the monomer mixture (or the (meth)acrylic copolymer) in an amount of about 0.01 to about 5 parts by weight, for example, about 0.03 to about 3 parts by weight, or about 0.05 to about 2 parts by weight, based on 100 parts by weight of the monomer mixture or the (meth)acrylic copolymer. For example, the crosslinking agent is present in an amount of about 0.05, 0.1, 0.15, 0.2, 0.25, or 0.3 parts by weight.

The crosslinking agent may be present in the adhesive composition in an amount of about 0.01 wt % to about 5 wt %, for example, about 0.03 wt % to about 3 wt %, based on the total weight of solids in the adhesive composition. Within any of the foregoing ranges, the adhesive film and/or the adhesive composition can provide (or secure) high durability and adhesion. For example, the crosslinking agent is present in the adhesive composition in an amount of about 0.1 wt %, 0.11 wt %, 0.12 wt %, 0.14 wt %, 0.14 wt %, or 0.15 wt %, based on the total weight of solids in the adhesive composition.

The adhesive composition may optionally further include suitable additives in adhesive compositions or used in the preparation of adhesive films, such as silane coupling agents (e.g., silane compounds), curing accelerators, ionic liquids, lithium salts, inorganic fillers, softening agents, antioxidants, anti-aging agents, stabilizers, tackifier resins, modifying resins (such as polyol, phenol, acrylic, polyester, polyolefin, epoxy, epoxidized polybutadiene resins, and the like), leveling agents, antifoaming agents, plasticizers, dyes, pigments such as coloring pigments, extender pigments, and the like, treatment agents, UV protective agents, fluorescence brightening agents, dispersants, heat stabilizers, light stabilizers, UV absorbents, antistatic agents, lubricants, and solvents, as desired (or needed).

The silane coupling agents may further include an epoxy silane coupling agent, but the silane coupling agent is not limited thereto.

The additive (for example, the silane coupling agent) may be present in the monomer mixture (or the (meth)acrylic copolymer) in an amount of about 0.01 parts by weight to about 0.1 parts by weight, for example, about 0.05 parts by weight to about 0.1 parts by weight, based on 100 parts by weight of the monomer mixture or the (meth)acrylic copolymer.

The additive (for example, the slime coupling agent) may be present in the adhesive composition in an amount of about 0.01 wt % to about 5 wt %, for example, about 0.01 wt % to about 1.5 wt %, based on the total weight of solids in the adhesive composition. Within any of the foregoing ranges, the adhesive film and/or the adhesive composition can secure high durability and adhesion.

The adhesive composition may have a viscosity at 25° C. of about 1,000 cPs to about 50,000 cPs, but the adhesive composition is not limited thereto.

The adhesive film and/or adhesive composition may be used to attach an optical film including a polarizing film, a transparent electrode film, and the like.

The method of preparing an adhesive film according to an embodiment of the present invention may include preparing a (meth)acrylic oligomer by polymerizing a monomer mixture, which includes the $C_1$ to $C_{20}$ alkyl group-containing alkyl(meth)acrylate, the alicyclic group-containing (meth)acrylate, the hydroxyl group-containing monomer, or a mixture thereof; mixing the (meth)acrylic oligomer with a urethane (meth)acrylate, an initiator, and a crosslinking agent to prepare an adhesive composition; and UV curing the adhesive composition. The (meth)acrylic oligomer is substantially free from solvents and may have a viscosity at 25° C. of about 1,000 cPs to about 50,000 cPs. As used herein, "substantially free from solvents" refers to the absence of most of the solvent, but some trace amount of solvent may be present. In some embodiments, the (meth)acrylic copolymer (e.g., the (meth)acrylic oligomer) is completely free of solvents.

Another aspect of the present invention provides an optical display (e.g., a display member). The optical display may include an optical film; and the adhesive film according to one embodiment of the invention attached to one or two (e.g., both) sides of the optical film.

In one embodiment, the optical display may include an optical film; and an adhesive film on (e.g., formed on) the optical film. Examples of the optical film may include polarizing plates, color filters, retardation films, elliptical polarizing films, reflective films, anti-reflective films, compensation films, brightness enhancing films, alignment films, light diffusion films, glass anti-scattering films, surface protective films, plastic LCD substrates, transparent conductive films such as indium tin oxide (ITO) films, and the like, but the optical film is not limited thereto. The optical film may be easily prepared by those skilled in the art using any suitable method used in the art. For example, a touch panel may be prepared by attaching a touchpad to a window or optical film using the adhesive film. In some embodiments, the adhesive film may be applied to a polarizing film as used in the related art. Examples of the optical display may include an organic light emitting device display, a liquid crystal display device, and the like, but the optical display is not limited thereto.

FIG. 1 is a cross-sectional view of a display of an organic light emitting device in accordance with one embodiment of the present invention.

Referring to FIG. 1, a display 100 of an organic light emitting device (OLED) includes a substrate 10, an OLED element 15 on (e.g., formed on) the substrate 10, an encapsulation layer 20 encapsulating the OLED element 15, a first adhesive film 25 on (e.g., formed on) the encapsulation layer 20, a transparent conductor on (e.g., formed on) the first adhesive film 25 and including a base material 35, a first transparent conductive layer 40 on (e.g., formed on) the base material 35 and a second transparent conductive layer 30 under (e.g., formed under) the base material 35, a polarizing plate 45 on (e.g., formed on) the first transparent conductive layer 40, a second adhesive film 50 on (e.g., formed on) the polarizing plate 45, and a window 55 on (e.g., formed on) the second adhesive film 50, where the first adhesive film 25, the second adhesive film 50, or both may be an adhesive film according to an embodiment of the invention.

The substrate 10 may be a substrate used in the art for displays of organic light emitting devices, but the substrate is not limited thereto. For example, the substrate 10 may be a TFT substrate. For example, the substrate 10 may be a glass substrate, or a plastic substrate such as a polyimide substrate, epoxy substrate, acryl substrate, silicone substrate, and the like. In some embodiments, the substrate may be a flexible substrate.

Although not shown in FIG. 1, the OLED element 15 refers to a component used in the art in OLED of the display, and may include a first electrode, a second electrode, and an organic electroluminescent layer, which is formed between the first and second electrodes by sequentially stacking a hole injection layer, a hole transport layer, a light emitting layer, an electron transport layer, and an electron injection layer, but the present disclosure is not limited thereto.

The encapsulation layer 20 protects the OLED element 15 from external moisture or oxygen, and may include (e.g., be formed of) an inorganic material, an organic material, or a mixture thereof.

The transparent conductor has electrical conductivity and generates electric signals in response to external stimulation. The transparent conductor may include the base material 35 and the first and second transparent conductive layers 40, 30 on (e.g., formed on) two (e.g., both) surfaces of the base material 35. The base material 35 may be an optically transparent film (for example, polycarbonate and polyester films including polyethylene terephthalate films, and the like), or a glass substrate. The first and second transparent conductive layers 40, 30 may include (e.g., be formed of) the same material or different materials, and may include any suitable material, for example, indium tin oxide (ITO) films or metal nanowire-containing films so long as the materials of the first and second transparent conductive layers are transparent conductive films having electrical conductivity. The first transparent conductive layer 40 and/or the second conductive layer 30 may be subjected to patterning.

The first adhesive film 25 adheres the encapsulation layer 20 to the second transparent conductive layer 30, and the second adhesive film 50 adheres the first transparent conductive layer 40 to the window 55. The first and second adhesive films 25, 50 may include (e.g., be formed of) the same or different materials, and may include the adhesive film according to an embodiment of the invention, but the present disclosure is not limited thereto.

The polarizing plate 45 prevents (or reduces) reflection in the display of the organic light emitting device. For example, the polarizing plate may include a polarizer, a protective film and/or a retardation film on (e.g., formed on) the polarizer, but the polarizing plate is not limited thereto.

The window 55 acts as a display screen and may include (e.g., be formed of) glass or plastic materials, but the window is not limited thereto. In some embodiments, the window may include (e.g., be formed of) a flexible material.

Figure 2:
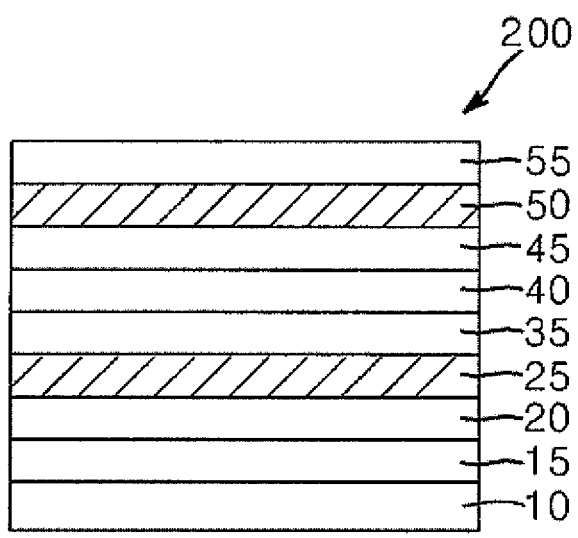
FIG. 2 is a cross-sectional view of a display of an organic light emitting device in accordance with another embodiment of the present invention.

FIG. 2 is a cross-sectional view of a display of an organic light emitting device in accordance with another embodiment of the present invention.

Referring to FIG. 2, a display 200 of an organic light emitting device (OLED) includes a substrate 10, an OLED element 15 on (e.g., formed on) the substrate 10, an encapsulation layer 20 encapsulating the OLED element 15, a first adhesive film 25 on (e.g., formed on) the encapsulation layer 20, a transparent conductor on (e.g., formed on) the first adhesive film 25 and including a base material 35 and a first transparent conductive layer 40 on (e.g., formed on) the base material 35, a polarizing plate 45 on (e.g., formed on) the first transparent conductive layer 40, a second adhesive film 50 on (e.g., formed on) the polarizing plate 45, and a window 55 on (e.g., formed on) the second adhesive film 50, where the first adhesive film 25, the second adhesive film 50, or both may be an adhesive film according to an embodiment of the invention.

The display according to this embodiment is the same as the display according to the above embodiment except that it does not include the second transparent conductive layer 30.

In addition, displays for organic light emitting devices according to embodiments of the invention may omit the encapsulation layer 20 and/or the polarizing plate 45, if such omission does not create a problem in the normal operation of the display.

Next, the present invention will be described with reference to some examples. It should be understood that these examples are provided for illustration only and are not to be construed in any way as limiting the present invention.

The components used in the Examples and Comparative Examples were as follows:

(A) (Meth)acrylic copolymer: Copolymer of 2-ethylhexyl acrylate (EHA), isobornyl acrylate (IBOA), and 2-hydroxyethyl acrylate (HEA)

(B) Urethane (meth)acrylate: XSUO (available from Shina T&C)

(C) Initiator: Irgacure™ 651 (2,2-dimethoxy-2-phenylacetophenone) (available from Ciba Japan K.K.)

(D) Crosslinking agent: 1,6-hexanediol diacrylate (HDDA)

(E) Silane coupling agent: Siloxane epoxy silane (X-41-1059A, available from Shin-Etsu Co., Ltd.)

Examples and Comparative Examples

Viscous liquids having a viscosity of about 1,500 cPs were prepared by mixing the (A) (meth)acrylic copolymer in an amount as listed in Table 1 (unit: parts by weight) and 0.04 parts by weight of the (C) initiator in a glass container, followed by replacing dissolved oxygen with nitrogen gas, and partially polymerizing the mixture through irradiation using a low pressure lamp for a few minutes. To the prepared liquids, the (B) urethane (meth)acrylate, the (D) crosslinking agent and the (E) silane coupling agent in amounts as listed in Table 1, and 0.16 parts by weight of the (C) initiator were added and sufficiently mixed to prepare adhesive compositions. Each of the prepared adhesive compositions was applied to a 50 μm thick polyester release film, followed by performing release treatment to form a layer having a thickness of 175 μm. In order to remove oxygen, which can have a negative influence on polymerization, the release film was covered, and UV irradiation was performed above (or through) two surfaces thereof using a low pressure lamp for about 3 minutes, thereby providing a transparent adhesive film.

The following properties of the prepared adhesive films prepared in the Examples and Comparative Examples were evaluated and results are shown in Table 1.

(1) Peel strength at 25° C.: The prepared adhesive film was laminated onto an ITO film using a 50 μm thick PET film (backing film). Next, the adhesive film was cut into a specimen having a size of 25 mm×120 mm and pressed onto glass (e.g. soda lime glass) under a roll having a weight of 2 kg to prepare a specimen. Thereafter, the specimen was aged for 30 minutes at 25° C., and 180° peel strength was measured at 25° C. by peeling the adhesive film from the ITO film at a rate of 0.3 m/min using a texture analyzer TA.XT_Plus (available from Stable Micro Systems).

(2) Peel strength at 70° C.: A specimen was prepared as described above, except that prior to aging for 30 minutes at 25° C., the specimen was left in a convection oven at 70° C. for 2 minutes. Thereafter, the specimen was aged for 30 minutes at 25° C., and 180° peel strength was measured at 25° C. by peeling the adhesive film from the ITO film at a rate of 0.3 m/min using a texture analyzer TA.XT_Plus (available from Stable Micro Systems).

(3) Peel strength ratio: The ratio of the peel strength at 70° C. to the peel strength at 25° C. was calculated.

(4) Durability: A specimen was prepared by laminating the adhesive film on an ITO film, followed by laminating a glass sheet or polycarbonate film onto the adhesive film. After autoclaving, the specimen was left at 60° C./90% relative humidity (RH) for 500 hours. The occurrence of detachment, delamination, peeling, or bubbling between the adhesive film and the glass or polycarbonate film was observed with the naked eye. Standards for evaluation were as follows.

○: Good (No bubbling or peeling) Δ: Not poor (Slight bubbling or peeling)

x: Poor (Severe bubbling or peeling)

Figure 3:
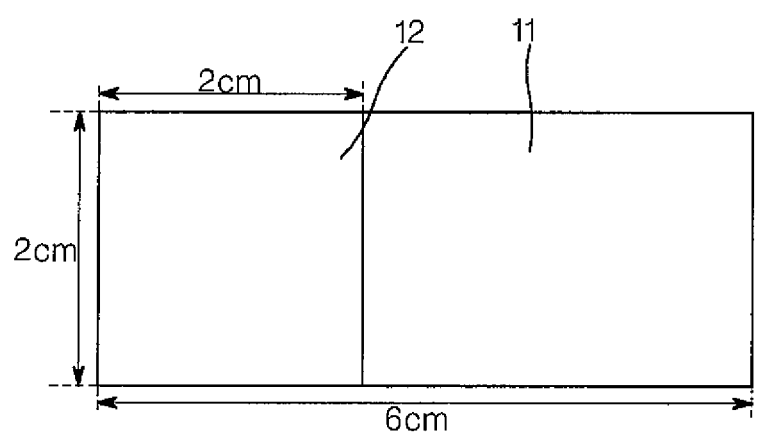
FIGS. 3 and 4 are diagrams of shear strength specimens.
Figure 4:
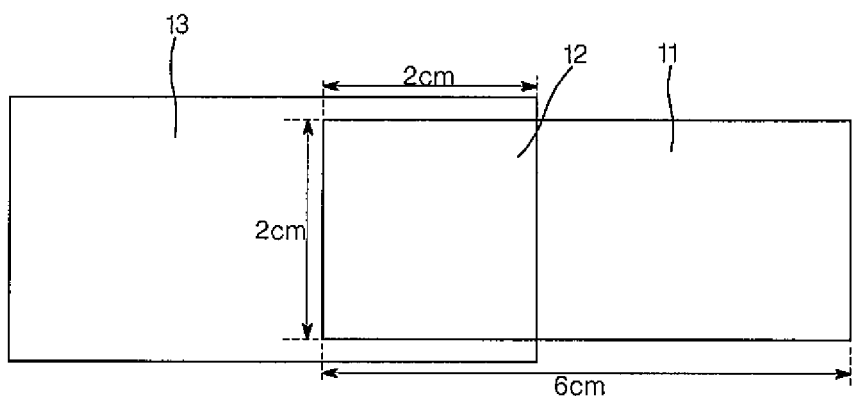

(5) Shear strength: The adhesive film was laminated onto an ITO film using a 2 kg roll, as illustrated in FIG. 3. In FIG. 3, Reference numeral 11 indicates the ITO film and Reference numeral 12 indicates a laminated portion between the adhesive film and the ITO film. After removing a middle film, STN glass was laminated onto a lower side of the laminated portion between the adhesive film and the ITO film using an automatic laminator, as illustrated in FIG. 4. In FIG. 4, Reference numeral 11 indicates the ITO film, Reference numeral 12 indicates the laminated portion between the adhesive film and the ITO film, and Reference numeral 13 indicates the STN glass. The prepared specimen was left in a convection oven at 70° C. for 2 minutes, followed by aging at room temperature for 2 hours and measurement of shear strength at 127 mm/min using a universal testing machine (UTM).

(6) Initial reworkability: The adhesive film was stacked on an ITO film, followed by stacking a glass or polycarbonate film on the adhesive film to prepare a specimen. It was evaluated whether an adhesive film residue was left on the surface of the adherend or whether separation failure occurred upon separation of the adhesive film. In the results shown below, with respect to initial reworkability, the symbol ○ indicates that no separation failure occurred and/or no residue was left behind, and the symbol x indicates that the occurrence of separation failure and/or residue was left behind.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Preparation Method | UV curing | UV curing | UV curing | UV curing | UV curing | UV curing | UV curing |
| (A) EHA | 65 | 65 | 65 | 65 | 65 | 65 | 65 |
| IBOA | 20 | 20 | 20 | 20 | 20 | 20 | 20 |
| HEA | 15 | 15 | 15 | 15 | 15 | 15 | 15 |
| (B) Content | 3 | 3 | 5 | — | 5 | 5 | 10 |
| Tg (° C.) | 5 | −5 | −5 | — | −50 | −30 | −5 |
| (C) | 0.2 | 0.2 | 0.2 | 0.2 | 0.2 | 0.2 | 0.2 |
| (D) | 0.15 | 0.15 | 0.15 | 0.15 | 0.15 | 0.15 | 0.15 |
| (E) | 0.1 | 0.1 | 0.1 | 0.1 | 0.1 | 0.1 | 0.1 |
| Peel strength (A) at 70° C. (g/inch) | 200 | 300 | 150 | 1500 | 1400 | 800 | 130 |
| Peel strength (B) at 70° C. (g/inch) | 1300 | 1500 | 1400 | 2300 | 2400 | 1500 | 520 |
| Peel strength ratio (B/A) | 6.5 | 5 | 9.3 | 1.53 | 1.7 | 1.875 | 4 |
| Shear strength (kgf) | 15↑ | 15↑ | 15↑ | 15↑ | 15↑ | 15↑ | 8↓ |
| Durability | ○ | ○ | ○ | ○ | ○ | ○ | x |
| Initial reworkability | ○ | ○ | ○ | x | x | x | ○ |

As shown in Table 1, the adhesive film according to embodiments of the present invention has low peel strength at 25° C. and thus allows reworking upon lamination failure, while providing (or ensuring) sufficient peel strength at high temperature to provide sufficient adhesion and durability. For example, because the adhesive film according to embodiments of the present invention has low initial adhesion, the adhesive film can be removed from an adherend to allow reworking when the adhesive film has a malfunction or generates bubbles during a lamination process, and can increase adhesion at high temperature, thereby improving durability.

While certain embodiments of the present invention have been illustrated and described herein, it should be understood by those of ordinary skill in the art that various modifications, changes, alterations, and equivalent embodiments can be made to the disclosed embodiments without departing from the spirit and scope of the invention as defined by the following claims, and equivalents thereof. Throughout the text and claims, use of the word "about" reflects the penumbra of variation associated with measurement, significant figures, and interchangeability, all as understood by a person having ordinary skill in the art to which this disclosure pertains. Additionally, throughout this disclosure and the accompanying claims, it is understood that even those ranges that may not use the term "about" to describe the high and low values are also implicitly modified by that term, unless otherwise specified.

What is claimed is:

1. An adhesive film comprising a urethane functional group, the adhesive film having a ratio (B/A) of 180° peel strength (B) after leaving the adhesive film at 70° C. for 2 minutes to 180° peel strength (A) at 25° C. of about 5 or more,
   wherein the adhesive film comprises a cured product of an adhesive composition comprising a urethane (meth)acrylate and a (meth)acrylic copolymer,
   wherein the urethane (meth)acrylate has a glass transition temperature of about −5° C. to 5° C.,
   wherein the urethane (meth)acrylate is present in the adhesive composition in an amount of about 1 wt % to about 9 wt % based on the total weight of solids in the composition,
   wherein the (meth)acrylic copolymer comprises a copolymer of about 50 wt % to about 70 wt % of an alkyl group-containing alkyl (meth)acrylate, about 15 wt % to about 25 wt % of an alicyclic group-containing (meth)acrylate, and about 5 wt % to about 35 wt % of the hydroxyl group-containing (meth)acrylate, based on the total weight of solids, and
   wherein the peel strength (A) is about 300 g/inch or less and the peel strength (B) is about 1000 g/inch or more, the alkyl group-containing alkyl (meth)acrylate comprises one or more of methyl (meth)acrylate, ethyl (meth)acrylate, propyl (meth)acrylate, butyl (meth)acrylate, pentyl (meth)acrylate, hexyl (meth)acrylate, ethylhexyl (meth)acrylate, heptyl (meth)acrylate and octyl (meth)acrylate.

2. The adhesive film according to claim 1, wherein the adhesive film has a shear strength at 25° C. of about 15 kgf or more.

3. The adhesive film according to claim 1, wherein the adhesive composition further comprises an initiator, a crosslinking agent, a silane coupling agent, or a mixture thereof.

4. The adhesive film according to claim 3, wherein the adhesive composition comprises, in terms of solid content,
- about 100 parts by weight of the (meth)acrylic copolymer;
- about 1 part by weight to about 9 parts by weight of the urethane (meth)acrylate;
- about 0.001 parts by weight to about 5 parts by weight of the initiator;
- about 0.01 parts by weight to about 5 parts by weight of the crosslinking agent; and
- about 0.01 parts by weight to about 0.1 parts by weight of the silane coupling agent.

5. The adhesive film according to claim 1, wherein the adhesive film has a thickness of about 10 μm to about 2 mm.

6. A display member comprising:
- an optical film; and
- an adhesive film according to claim 1 attached to one or two surfaces of the optical film.

7. The display member according to claim 6, wherein the optical film comprises a touch panel, a window, a polarizing plate, a color filter, a retardation film, an elliptical polarizing film, a reflective film, an anti-reflective film, a compensation film, a brightness enhancing film, an alignment film, a light diffusion film, a glass anti-scattering film, a surface protective film, a plastic LCD substrate, an indium tin oxide (ITO) containing film, a fluorinated tin oxide (FTO) containing film, an aluminum-doped zinc oxide (AZO) containing film, a carbon-nanotube (CNT) containing film, an Ag-nanowire containing film, or graphene.

\* \* \* \* \*